(12) United States Patent
Devine et al.

(10) Patent No.: US 7,089,311 B2
(45) Date of Patent: Aug. 8, 2006

(54) METHODS, SYSTEMS AND COMPUTER PROGRAM PRODUCTS FOR RESUMING SNA APPLICATION-CLIENT COMMUNICATIONS AFTER LOSS OF AN IP NETWORK CONNECTION

(75) Inventors: Wesley McMillan Devine, Apex, NC (US); Douglas Alan Trottman, Raleigh, NC (US); Sue L. Huang, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 917 days.

(21) Appl. No.: 09/773,437

(22) Filed: Jan. 31, 2001

(65) Prior Publication Data

US 2002/0103909 A1 Aug. 1, 2002

(51) Int. Cl.
*G06F 15/16* (2006.01)
*H04L 12/28* (2006.01)
*H04L 12/56* (2006.01)

(52) U.S. Cl. .................................................. 709/227
(58) Field of Classification Search ................ 709/220, 709/223–224, 227–228
See application file for complete search history.

(56) References Cited

U.S. PATENT DOCUMENTS

| | | | | |
|---|---|---|---|---|
| 4,403,286 A | | 9/1983 | Fry et al. ..................... 364/200 |
| 4,495,570 A | | 1/1985 | Kitajima et al. ............ 364/200 |
| 4,577,272 A | | 3/1986 | Ballew et al. ............... 364/200 |
| 4,893,307 A | * | 1/1990 | McKay et al. .............. 370/389 |
| 4,949,248 A | * | 8/1990 | Caro .......................... 709/203 |
| 5,031,089 A | | 7/1991 | Liu et al. .................... 364/200 |
| 5,287,534 A | * | 2/1994 | Reuther et al. ............. 714/819 |
| 5,325,361 A | * | 6/1994 | Lederer et al. ............. 370/401 |
| 5,347,632 A | * | 9/1994 | Filepp et al. ............... 709/202 |
| 5,455,865 A | * | 10/1995 | Perlman ..................... 713/153 |
| 5,590,340 A | * | 12/1996 | Morita et al. ............... 713/323 |
| 5,611,048 A | * | 3/1997 | Jacobs et al. ............... 713/202 |
| 5,675,739 A | | 10/1997 | Eilert et al. ................. 395/200 |
| 5,727,159 A | * | 3/1998 | Kikinis ....................... 709/246 |
| 5,754,752 A | * | 5/1998 | Sheh et al. ................... 714/4 |
| 5,754,830 A | * | 5/1998 | Butts et al. ................. 719/311 |
| 5,757,920 A | * | 5/1998 | Misra et al. ................ 713/158 |
| 5,758,084 A | * | 5/1998 | Silverstein et al. ......... 709/228 |
| 5,802,278 A | * | 9/1998 | Isfeld et al. ................ 709/249 |
| 5,832,510 A | * | 11/1998 | Ito et al. ..................... 707/201 |
| 5,835,721 A | * | 11/1998 | Donahue et al. ........... 709/224 |

(Continued)

FOREIGN PATENT DOCUMENTS

JP 03055648 A * 3/1991

(Continued)

OTHER PUBLICATIONS

TDB-ACC-NO: NN86034482. "Authomatic Recovery of IBM Personal Computer Network Session," IBM Technical Disclosure Bulletin, Mar. 1, 1986; vol. 28, Issue 10, pp. 4482-4483. Cross Reference 0018-8689-28-10-4482.*

(Continued)

*Primary Examiner*—Beatriz Prieto
*Assistant Examiner*—Michael D. Meucci
(74) *Attorney, Agent, or Firm*—Myers Bigel Sibley & Sajovec; Jerry W. Herndon

(57) ABSTRACT

Systems, methods and computer program products are provided for preserving a session between an SNA application and a TN3270E server after loss of an IP network connection between the TN3270E server and a TN3270E client that is communicating with the SNA application via the SNA session.

11 Claims, 6 Drawing Sheets

U.S. PATENT DOCUMENTS

| | | | | |
|---|---|---|---|---|
| 5,881,239 A * | 3/1999 | Desgrousilliers | ............ | 709/226 |
| 5,896,499 A * | 4/1999 | McKelvey | .................. | 713/201 |
| 5,917,997 A | 6/1999 | Bell et al. | .............. | 395/182.02 |
| 5,923,854 A | 7/1999 | Bell et al. | .............. | 395/200.73 |
| 5,935,215 A * | 8/1999 | Bell et al. | ................... | 709/239 |
| 5,940,771 A * | 8/1999 | Gollnick et al. | ............ | 455/517 |
| 5,951,650 A | 9/1999 | Bell et al. | ................... | 709/238 |
| 5,974,409 A * | 10/1999 | Sanu et al. | ..................... | 707/3 |
| 6,006,331 A * | 12/1999 | Chu et al. | ......................... | 726/5 |
| 6,012,052 A * | 1/2000 | Altschuler et al. | ............. | 707/2 |
| 6,014,669 A * | 1/2000 | Slaughter et al. | ............. | 707/10 |
| 6,014,702 A * | 1/2000 | King et al. | ................. | 709/227 |
| 6,028,600 A * | 2/2000 | Rosin et al. | ................ | 345/718 |
| 6,031,978 A * | 2/2000 | Cotner et al. | ............... | 709/248 |
| 6,065,116 A * | 5/2000 | Isaacson et al. | ................ | 713/1 |
| 6,088,738 A * | 7/2000 | Okada | ......................... | 709/245 |
| 6,092,196 A * | 7/2000 | Reiche | ........................... | 726/6 |
| 6,128,662 A * | 10/2000 | Bolton et al. | ............... | 709/228 |
| 6,128,738 A * | 10/2000 | Doyle et al. | ................ | 709/228 |
| 6,182,142 B1 * | 1/2001 | Win et al. | ................... | 709/229 |
| 6,205,498 B1 * | 3/2001 | Habusha et al. | .............. | 710/29 |
| 6,279,001 B1 * | 8/2001 | DeBettencourt et al. | ...... | 707/10 |
| 6,330,607 B1 * | 12/2001 | Chmielewski et al. | ...... | 709/227 |
| 6,374,207 B1 * | 4/2002 | Li et al. | ........................ | 703/27 |
| 6,405,254 B1 * | 6/2002 | Hadland | ..................... | 709/230 |
| 6,415,331 B1 * | 7/2002 | Ariga | ........................... | 709/246 |
| 6,546,425 B1 * | 4/2003 | Hanson et al. | .............. | 709/227 |
| 6,587,867 B1 * | 7/2003 | Miller et al. | ................. | 709/200 |
| 6,598,167 B1 * | 7/2003 | Devine et al. | .............. | 713/201 |
| 6,601,087 B1 * | 7/2003 | Zhu et al. | .................... | 709/205 |
| 6,681,327 B1 * | 1/2004 | Jardin | ......................... | 713/153 |
| 6,707,567 B1 * | 3/2004 | Suzuki | ....................... | 358/1.15 |
| 6,711,715 B1 * | 3/2004 | Grealish | ..................... | 715/504 |
| 6,738,804 B1 * | 5/2004 | Lo | .............................. | 709/219 |
| 6,826,603 B1 * | 11/2004 | Giroir et al. | ................. | 709/220 |
| 6,829,642 B1 * | 12/2004 | Giroir et al. | ................. | 709/225 |
| 6,976,164 B1 * | 12/2005 | King et al. | .................. | 713/156 |

FOREIGN PATENT DOCUMENTS

| | | | |
|---|---|---|---|
| JP | 07319818 A | * | 12/1995 |
| JP | 11120140 A | * | 4/1999 |

OTHER PUBLICATIONS

TDB-ACC-NO: NN86034419; "Use of Host Application Name on Status Menu"; IBM Technical Disclosure Bulletin, Mar. 1986, vol. 28, Issue 10, p. 4419.*

TDB-ACC-NO: NN8804238; "Method for Obtaining a Three-Station 3270 Emulation Network"; IBM Technical Disclosure Bulletin, Apr. 1988, vol. 30, Issue 11, pp. 238-239.*

TDB-ACC-NO: NB9209258; "Applications for the TCP/IP Telnet Protocols"; IBM Technical Disclosure Bulletin, Sep. 1992, vol. 35, Issue 4B, pp. 258-260.*

TDB-ACC-NO: NB930617; "Remote Telephone Feature Controller via Electronic Distribution"; IBM Technical Disclosure Bulletin, Jun. 1993, vol. 36, Issue 6B, pp. 17-18.*

TDB-ACC-NO: NNRD410137; "TN3270(E) Host Based Correlation and Performance Management"; Research Disclosure, Jun. 1998, vol. 41, Issue 410.*

TDB-ACC-NO: NNRD422115; "Differentiated Service for Telnet 3270 Services"; Research Disclosure, Jun. 1999, vol. 42, Issue 422.*

Devine, Mac; "The TN3270 Server on IMB eserver zSeries 900 and S/390"; IBM Corporation, Oct. 2000, pp. 1-11.*

Khare, Rohit; "Telnet: The Mother of All (Application) Protocols"; Internet Computing, IEEE, vol. 2, Issue 3, May-Jun. 1998, pp. 88-91.*

Penner, J; "RFC 1576—TN3270 Current Practices"; Network Working Group, DCA Inc. Jan. 1994, pp. 1-12.*

Graves, C; Butts, T; Angel, M; "RFC 1646—TN3270 Extensions for LUname and Printer Selection"; Network Working Group, Open Connect Systems; Jul. 1994, pp. 1-13.*

Kelly, B; "RFC 1647—TN3270 Enhancements"; Network Working Group, Auburn University; Jul. 1994, pp. 1-34.*

Kelly, B; "RFC 2355—TN3270 Enhancements"; Networking Working Group, Auburn University, Jun. 1998, pp. 1-38.*

A. Dahlin, et al. *EDDIE A Robust and Scalable Internet Server*. Ericsson Telecom AB, Stockholm, Sweden (May 1998).

Brochure entitled, *ACEdirector™ 8-PORT 10/100 MBPS Ethernet Switch*. Alteon WebSystems, San Jose, CA (1999).

Brochure entitled, *Enhancing Web User Experience with Global Server Load Balancing*. Alteon WebSystems, San Jose, CA (Jun. 1999).

Brochure entitled, *The Next Step in Server Load Balancing*. Alteon WebSystems, San Jose, CA (Nov. 1999).

Mac Devine. Presentation entitled, *TCP/IP Application Availability and Workload Balancing in the Parallel Sysplex*. Share Technical Conference (Aug. 22-27, 1999).

http://w3.enterlib.ibm.com:80/cgi-bin/bookmgr/books/ FIAF7001/1.3.1.2; *1.3.12.5 Virtual IP Addressing(VIPA)*; Excerpt from IP Configuration for OS/390, pp. 1-4 (1998).

http://w3.enterlib.ibm.com:80/cgi-bin/bookmgr/books/ F1AF7001/1.3.2; *1.3.20 Device and Link Statement—Virtual Devices(VIPA)*; Excerpt from IP Configuration for OS/390, pp. 1-3 (1998).

http://w3.enterlib.ibm.com:80/cgi-bin/bookmgr/books/ F1AF7001/1.3.2; *1.3.23. HOME Statement*, Excerpt from IP Configuration for OS/390, pp. 1-6 (1998).

Hansen et al., *Dynamic Adaptation of Network Connections in Mobile Environments*, IEEE Internet Computing, Jan.-Feb. 1998.

Mac Devine. Presentation entitled, *Networking and the Parallel Sysplex*. OS/390 Expo and Performance Conference (Oct. 22, 1999).

Mac Devine. Presentation entitled, *The Parallel Sysplex: Concepts and Considerations*. Share Session 3406 (Mar. 5, 2000).

* cited by examiner

METHODS, SYSTEMS AND COMPUTER PROGRAM PRODUCTS FOR RESUMING SNA APPLICATION-CLIENT COMMUNICATIONS AFTER LOSS OF AN IP NETWORK CONNECTION

FIELD OF THE INVENTION

The present invention relates generally to SNA communications sessions and, more particularly, to recovery of such communications sessions after loss of a network connection.

BACKGROUND OF THE INVENTION

Mainframe computer systems are widely used for a variety of data processing functions. For example, many corporate financial and accounting systems were developed for, and operate on, mainframe computing systems. Although the use of personal computers and personal computer networks has proliferated in recent years, mainframe computer systems, referred to as legacy systems, are expected to remain popular for many types of data processing for years to come.

A mainframe computer system typically includes multiple user terminals connected to a mainframe host computer. Various software applications may be resident on, or accessible to, the host computer. The user terminals, which are sometimes referred to as client terminals or "clients", communicate with the mainframe host computer via a host communications system. The International Business Machine Corporation's ("IBM") 3270 terminal system is one of the more widely-used systems for communicating with host computers.

Typically, a 3270 terminal does not have its own data processing capability. Instead, a 3270 terminal may display screens generated by applications running on a host, and may communicate information from a user back to a host for processing. A user interface of an IBM 3270 terminal system comprises a plurality of screens that are generated by host applications for display on the 3270 terminal. Over the past few years, many 3270 terminals have been replaced with personal computers (PCs) configured to communicate with the mainframe computer system via 3270 terminal emulation software.

In many applications, 3270 terminals, or other data processing devices (e.g., a PC) emulating a 3270 terminal, now access the host computer via the Internet. For example, in systems operating under the TN3270E protocols, the 3270 terminals may access application software on a host computer via a combination of a Transmission Control Protocol/Internet Protocol (TCP/IP) protocol connection between the TN3270E client terminal and a TN3270E server, and via a Systems Network Architecture (SNA) session between the TN3270E server and the SNA application software on the host mainframe computer. Such SNA application software or "SNA applications" refer to software applications designed for use by a plurality of terminals interconnected by an SNA network or a variant of an SNA network.

FIG. 1 depicts such a mainframe computing system environment in which several TN3270E client terminals 20 communicate with several SNA applications 30 via a TN3270E server 40. The SNA applications 30 may be resident on one or more mainframe computers or other data processing systems (not shown in FIG. 1), or, alternatively, may be physically located separate from the one or more main frame computers/data processing devices but accessible by such devices. As shown in FIG. 1, the TN3270E clients 20 are connected to the TN3270E server 40 via Internet protocol or "IP" connections 25. The TN3270E server 40 is connected to the SNA applications 30 via SNA sessions 35.

In the TN3270E environment of FIG. 1, the SNA sessions extend only between the TN3270E server 40 and the SNA applications 30. Thus, the TN3270E server 40 converts IP communications from one of the TN3270E clients 20 into SNA format and forwards them to one of the SNA applications 30. The TN3270E server 40 likewise converts SNA communications received from an SNA application 30 into IP format and forwards them to the TN3270E client over the IP network.

In many legacy systems, each 3270 terminal was assigned a unique logical unit or "LU" name. Typically, legacy systems originated as hard-wired systems, and the LU name served to identify the particular terminal/user that was accessing the mainframe host computer. Consequently, many SNA software applications that were developed to run on these legacy systems included software routines that made decisions based on the LU name of the device/user accessing the terminal. Consistent with the requirements of these SNA applications, under the TN3270E protocol, a data processing device that is acting as a TN3270E client may specify an LU name when connecting to a TN3270E server. Typically, the TN3270E server will have information, such as Logmode information, regarding one or more LU names which may attempt to connect to SNA applications through the TN3270E server. Upon receiving a connection request from a TN3270E client, the TN3270E server may provide the SNA application certain of the information regarding the TN3270E client before establishing the SNA session. Moreover, typically a TN3270E server will only allow one SNA session at a time involving a particular LU name.

SUMMARY OF THE INVENTION

Systems, methods and computer program products are provided for preserving a session between an SNA application and a TN3270E server after loss of an Internet protocol ("IP") network connection between the TN3270E server and a TN3270E client that is communicating with the SNA application via the SNA session. In embodiments of the invention, the IP connection between the TN3270E server and the TN3270E client is reestablished and then the TN3270E server may forward a screen refresh request to the SNA application. The TN3270E server may also receive a screen refresh from the SNA application, and may forward this screen refresh to the TN3270E client over the reestablished IP connection. This screen refresh may comprise the last data screen that was forwarded from the SNA application which was acknowledged as received by the TN3270E client. The IP connection may be a TCP/IP connection or some other type or layer connection in an IP network.

One way in which the TN3270E server may forward the screen refresh request to the SNA application is by sending an LUSTAT message to the SNA application. When such an LUSTAT message is used, a user logon screen may be received from the SNA application in response to the LUSTAT message, which may be forwarded to the TN3270E client. Logon information may be received from the TN3270E client in response to the logon screen, and the authenticity of the received logon information checked. The screen refresh may then be forwarded to the TN3270E client over the reestablished IP connection if the received logon information is authentic. The SNA application may also send the screen refresh to the TN3270E server, for forwarding to the TN3270E client, without first sending the logon screen to the TN3270E client (via the TN3270E server) and receiving logon information in response thereto.

In further embodiments of the present invention, a TCP/IP connection between a TN3270E client and a TN3270E server is reestablished after loss of a first TCP/IP connection between the TN3270E client and the TN3270E server. In such embodiments, the TN3270E server may receive a connection request, where the connection request specifies an LU name that was specified in the first TCP/IP connection. In response to receiving this request, the TN3270E server may transmit a query addressed to the TN3270E client over the first TCP/IP connection. If a response to the query is not received within a specified time period, the TN3270E server establishes a second TCP/IP connection in response to the connection request, and resumes communications over this second TCP/IP connection. In these embodiments, the query may comprise a query to which the TN3270E client automatically responds such as a timemark request. Furthermore, the identity of the TN3270E client may be authenticated prior to resuming communications with the TN3270E client over the second TCP/IP connection.

As will be appreciated by those of skill in the art in light of the present disclosure, embodiments of the present invention may include methods, systems (devices) and/or computer program products.

DETAILED DESCRIPTION OF PREFERRED EMBODIMENTS

Figure 1:
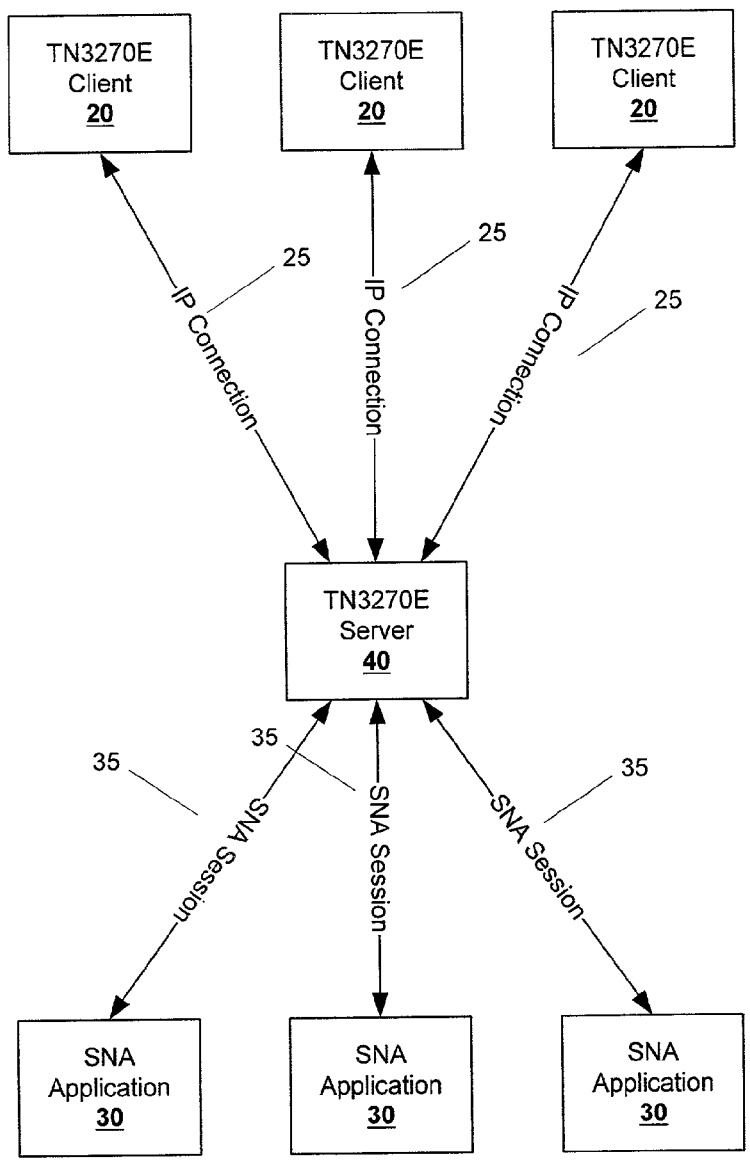
FIG. 1 schematically illustrates host communications between several SNA applications and several TN3270E client terminals over an IP network.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As will be appreciated by one of skill in the art, the present invention may be embodied as a method, data processing system, and/or computer program product. Accordingly, the present invention may take the form of an entirely hardware embodiment, an entirely software embodiment or an embodiment combining software and hardware aspects. Furthermore, the present invention may take the form of a computer program product on a computer-usable storage medium having computer-usable program code means embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language. The program code may execute entirely on a single computer, or be distributed so as to execute on a plurality of computers and/or data processing devices.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart and/or block diagram block or blocks.

Figure 2:
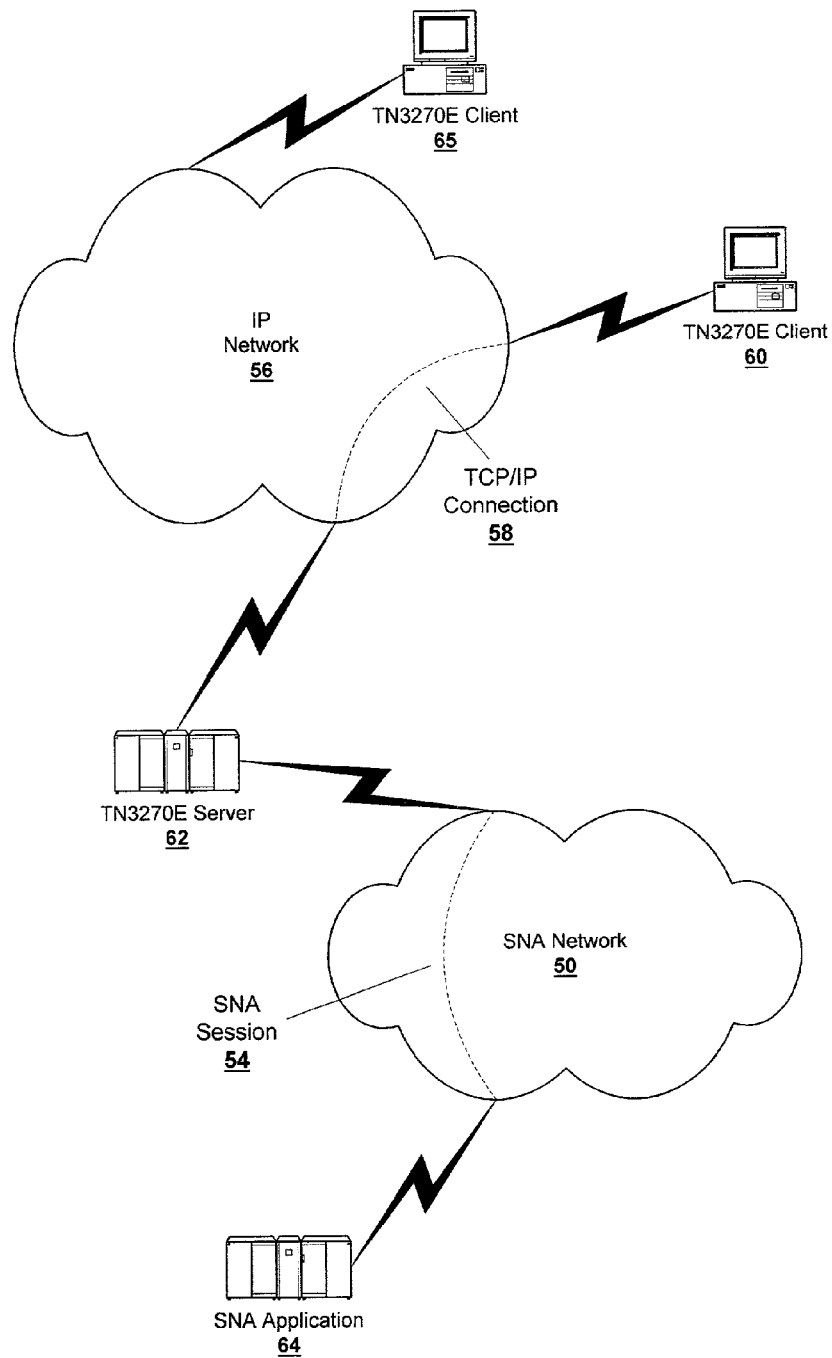
FIG. 2 illustrates a TN3270E communications environment incorporating embodiments of the present invention.

Pursuant to embodiments of the present invention, methods, systems and computer program products are provided for preserving a session between an SNA application and a TN3270E server after loss of an IP network connection between the TN3270E server and a TN3270E client that is communicating with the SNA application via the SNA session. FIG. 2 depicts a TN3270E computing environment incorporating embodiments of the present invention. As shown in FIG. 2, a TN3270E client terminal 60 accesses an SNA application 64 that is resident on a remote mainframe computer via a TN3270E server 62. The TN3270E client 60 communicates with the TN3270E server 62 over a TCP/IP transport layer connection 58 in an Internet protocol network 56. The TN3270E server 62 converts communications from the TN3270E client 60 into a format suitable for transmission over an SNA network, and then forwards these communications to SNA application 64 via an SNA session 54 in SNA network 50. The TN3270E server 62 likewise converts SNA communications from SNA application 64 into a format suitable for transmission over TCP/IP connection 58 to TN3270E client 60.

In a conventional TN3270E environment, if the TCP/IP connection 58 depicted in FIG. 2 is broken (i.e., due to a switch or router failure), the SNA session 54 would have to be restarted once the TCP/IP connection 58 was reestablished (or an alternate TCP/IP connection implemented in its place). Loss of this SNA session could result in several negative impacts, including (i) increased use of resources in the SNA network 50 at the SNA nodes along the session path resulting from clean-up of the original SNA session, (ii) increased use of the resources in the SNA session 54, (iii) potential confusion which may result from SNA session failure messages that may result when the original SNA session 54 is torn down and (iv) loss of SNA network availability due to the delay associated with tearing down and reestablishing SNA session 54.

Figure 3:
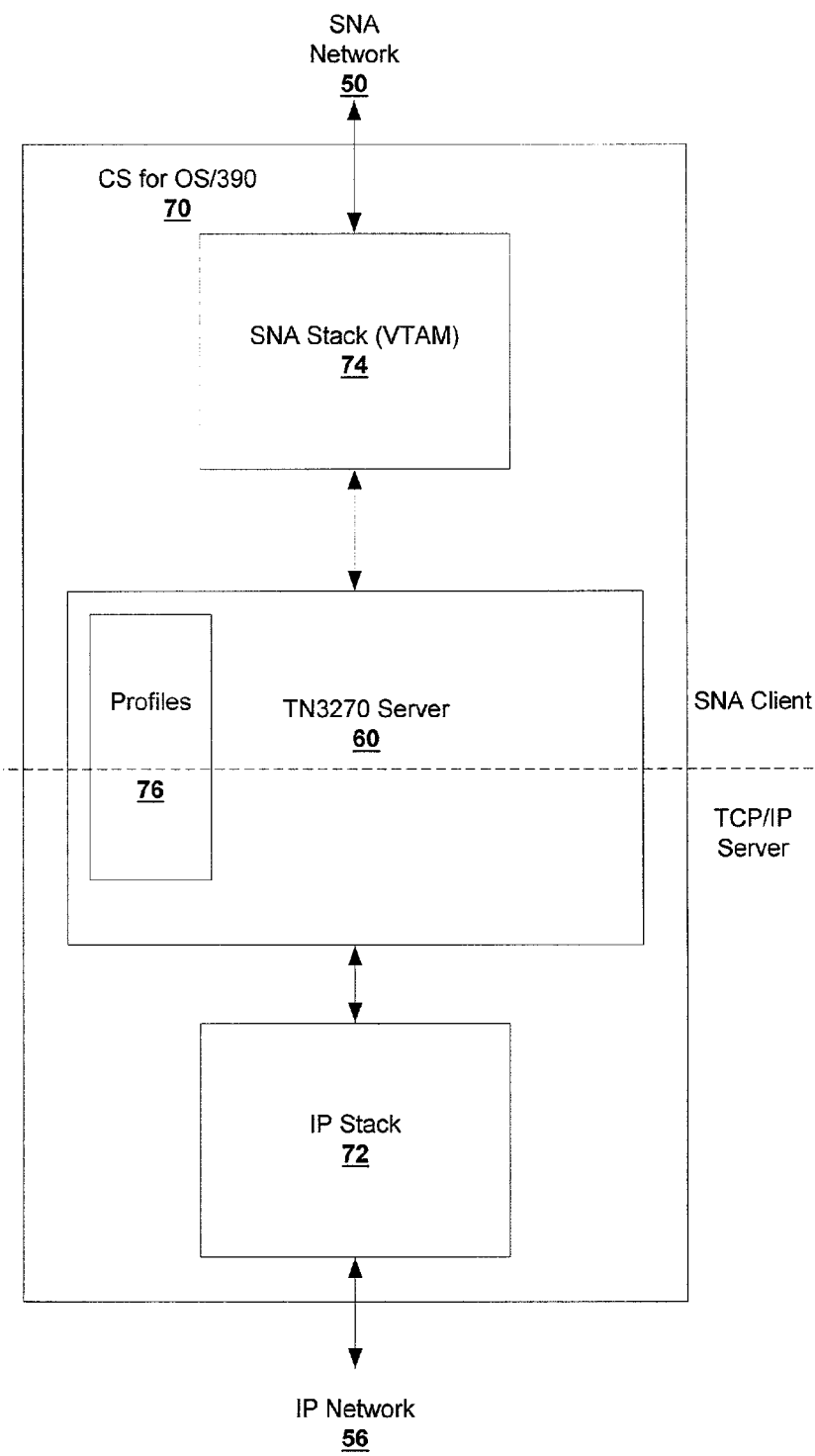
FIG. 3 is a block diagram of portions of the communications server for the OS/390 operating system incorporating embodiments of the present invention.

In embodiments of the present invention, the operations for preserving the SNA session across the reconnect of a TCP/IP connection may be carried out by the TN3270E server 62. However, it will be appreciated in light of the teachings of the present disclosure that the operations could be carried out by a separate data processing unit. One type of TN3270E server 62 which could be modified in accordance with the teachings of the present invention is the communications server for the OS/390 operating system ("CS-OS/390"). FIG. 3 depicts such a CS-OS/390 operating system 70.

As illustrated in FIG. 3, the CS-OS/390 operating system 70 includes a TN3270E server 62 that acts as an interface between the IP network 56 and the SNA network 50. The CS-OS/390 operating system 70 communicates with the IP network 56 via an IP stack 72, which is operatively coupled to the TN3270E server 62. The CS-OS/390 operating system 70 likewise includes an SNA stack 74 (such as the Virtual Telecommunications Access Manager or "VTAM") via which the operating system may communicate with devices in the SNA network 50. The SNA stack 74 is likewise operatively coupled to the TN3270E server 62. Profiles 76 associated with client terminals in the IP network may be stored by the TN3270E server 62.

Pursuant to embodiments of the present invention, methods, systems and computer program products are provided for expediting the reconnect of a TN3270E client 60 to a TN3270E server 62 after loss of a connection, such as the TCP/IP connection 58 in the IP network 56 (see FIG. 2). In certain situations, the TN3270E client 60 may become aware of the loss of the TCP/IP connection 58 to the TN3270E server 62 before the TN3270E server 62 becomes aware that the TCP/IP connection 58 has been lost. This may occur, for example, when the break in the TCP/IP connection 58 happens at, or very close to, the TN3270E client 60, and/or because the TN3270E server 62 has a relatively long value (e.g., on the order of minutes) on its inactivity timer.

In these situations, the TN3270E client 60 may attempt to reestablish the TCP/IP connection 58 with the TN3270E server 62 before the TN3270E server 62 becomes aware that the original TCP/IP connection 58 is lost. However, since the TN3270E server 62 does not realize that the original TCP/IP connection 58 has been lost, the TN3270E server 62 may interpret the connection request from the TN3270E client that seeks to reestablish the original TCP/IP connection 58 as a second TN3270E client 65 attempting to connect using an already allocated LU name (as the connection request would specify the LU name specified in the connection request that established the original TCP/IP connection 58).

In conventional systems (see FIG. 1), when the TN3270E server 40 receives a connection request specifying an existing LU name, the TN3270E server 40 typically will reject the connection request as an improper attempt to use an already allocated LU name. The TN3270E server 40 may thereafter continue to reject additional reconnection requests from the original TN3270E client 20 until the inactivity period expires and the TN3270E server 40 realizes that the original TCP/IP connection 25 has been lost.

Figure 4:
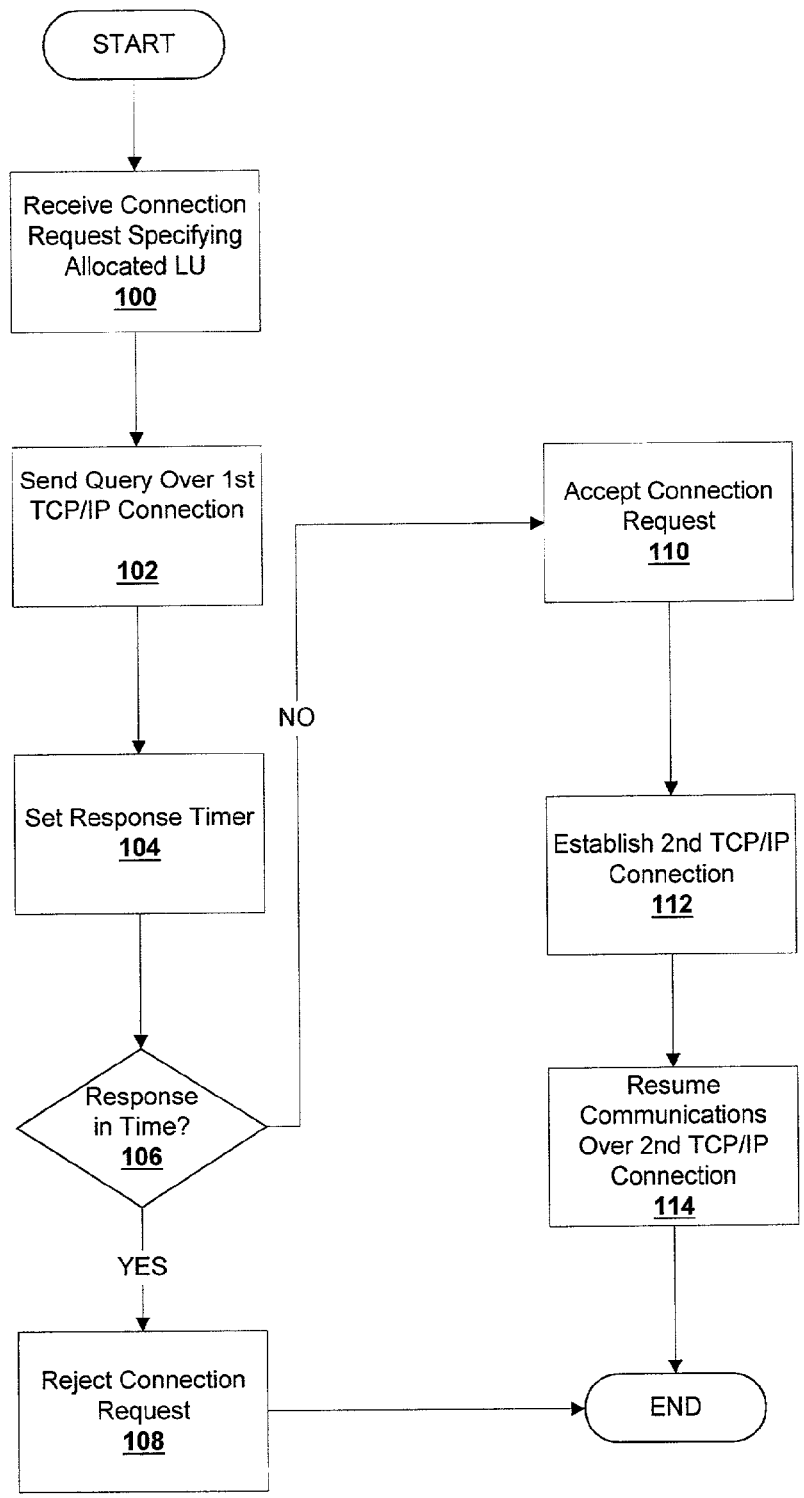
FIG. 4 is a flow chart illustrating operations according to embodiments of the present invention.

Pursuant to the teachings of the present invention, the delays which may occur in the above-described scenario may be reduced by sending a query to the original TN3270E client 60 in the event that the TN3270E server 62 receives a second connection request specifying the LU name associated with the original TCP/IP connection 58. FIG. 4 depicts operations associated with such queries according to embodiments of the present invention.

As shown in FIG. 4, operations may begin upon the receipt of a connection request which specifies an LU name that is already associated with the existing (first) TCP/IP connection 58 between the TN3270E server 62 and the first TN3270E client 60 (block 100). Upon receiving this connection request, a query is transmitted over the first TCP/IP connection 58 that is addressed to the first TN3270E client 60 (block 102). Upon transmitting the query, the TN3270E server 62 may set a response timer (block 104). If a response to the query is received before the response timer times out (block 106), the connection request is rejected (block 108). If, on the other hand, the response timer times out (block 106) without receipt of any response from the first TN3270E client 60, the TN3270E server 62 assumes that the first TCP/IP connection 58 has been lost, and thus may accept the connection request (block 110) and establish a new TCP/IP connection (block 112). Once this new TCP/IP connection is established, the TN3270E server 62 may resume communications with the TN3270E client 60 over this new TCP/IP connection (block 114).

Figure 5:
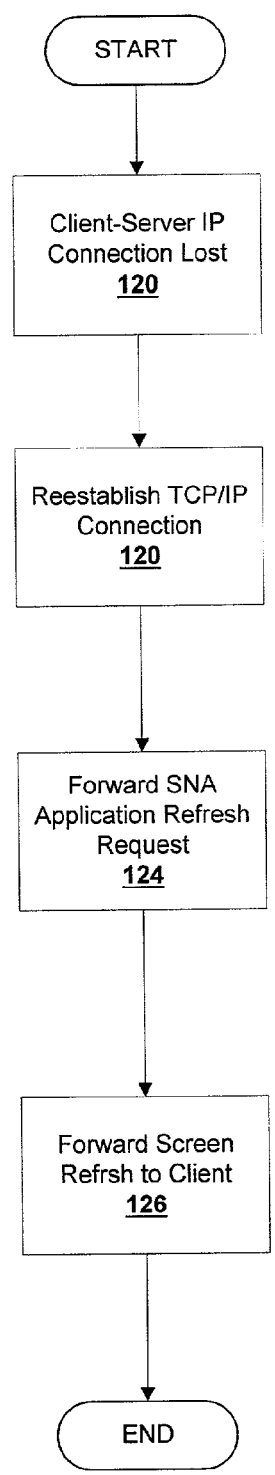
FIG. 5 is a flow chart illustrating operations according to alternative embodiments of the present invention.

Pursuant to other embodiments of the present invention, methods, systems and computer program products are provided for preserving the SNA session 54 between the SNA application 64 and the TN3270E server 62 during the time required to reconnect the TN3270E client 60 that is accessing the SNA application 64 to the TN3270E server 62 after loss of the IP network connection 58 (see FIG. 2). FIG. 5 illustrates operations according to embodiments of the present invention whereby the SNA session 54 between the SNA application 64 and the TN3270E server 62 may be preserved across the reconnect of the lost IP connection 58 between the TN3270E server 62 and the TN3270E client 60.

Conventionally, as illustrated in FIG. 1, upon the loss of an IP connection 25, the SNA session 35 is torn down and reestablished anew, as the TN3270E server 40 and/or SNA application 30 typically do not know how much data was received by the TN3270E client 20 prior to loss of the IP network connection 25. As shown in FIG. 5, according to embodiments of the present invention, operations begin upon the loss of the IP connection 58 between the TN3270E server 62 and the TN3270E client 60 that is associated with the SNA session 54 (block 120). Upon identifying the loss of the IP connection 58, the TN3270E client 60 and/or TN3270E server 62 act to reestablish the IP connection 58 (block 122). This may be accomplished, for example, using the operations of FIG. 4 or via conventional steps for reestablishing such a connection. Once the IP connection 58 is reestablished, the TN3270E server 62 may forward a request to the SNA application 64 for a screen refresh (block 124). It will be appreciated, however, that the TN3270E client 60 or another device monitoring the session could likewise forward the screen refresh request to the SNA application 64. A screen refresh request constitutes a request that the application retransmit the data required to redisplay a screen that was previously displayed on the client terminal. So long as the SNA application 64 includes such a screen refresh capability, it may retransmit to the TN3270E client 60 the data corresponding to the last screen (which herein may be referred to as a "screen") which was confirmed as having been received by the TN3270E client 60 (or, alternatively, may send the next screen or a prior screen) (block 126). As these operations provide a mechanism for resynchronizing the TN3270E client 60 and the SNA application 64 after the loss of the IP connection 58, there is no need for the TN3270E server 62 to terminate the original SNA session 54 after loss of the IP connection 58. Consequently, the SNA session 54 is preserved across the IP connection reconnect, and the SNA application 64 is resynchronized with the TN3270E client 60 according to the operations of FIG. 5.

Figure 6:
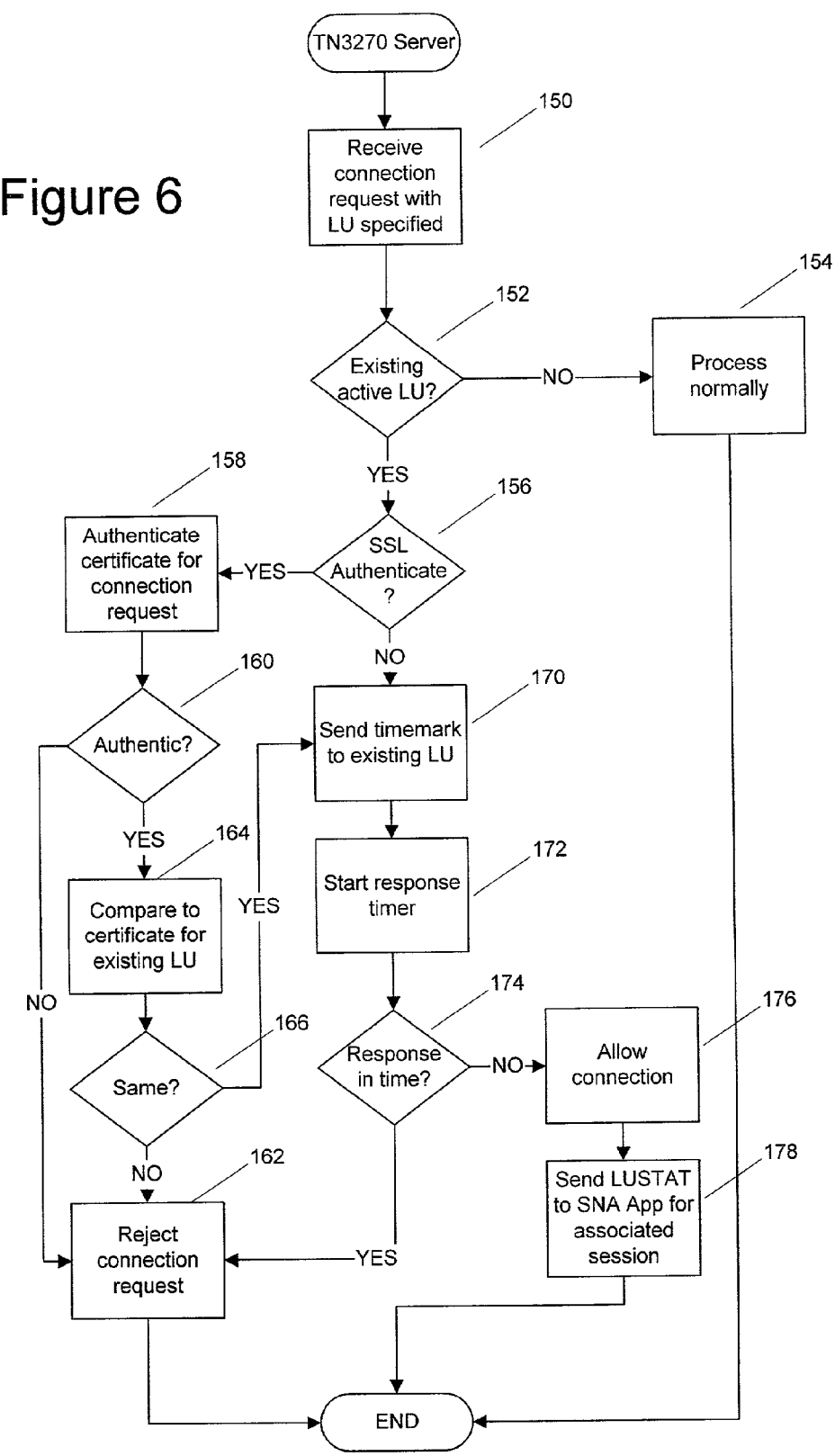
FIG. 6 is a flow chart illustrating operations according to additional embodiments of the present invention.

FIG. 6 depicts operations according to further embodiments of the present invention which illustrate an exemplary way in which the IP reconnection procedures of FIG. 4 could be combined with the operations for preserving an SNA session across the reconnect of FIG. 5. The operations of FIG. 6 further include optional client authentication procedures which may be used to provide a more secure reconnect of the lost IP connection.

As shown in FIG. 6, operations commence when the TN3270E server receives a connection request (block 150). As noted above, such a connection request typically specifies an LU name. The TN3270E server 62 determines whether or not the specified LU name has already been allocated to an existing IP connection between the TN3270E server 62 and a first TN3270E client 60 (block 152). If the LU name is not currently allocated, the connection request is processed normally (block 154), and operations are concluded.

If the LU name specified in the connection request is currently allocated to an existing IP connection (block 152), the TN3270E server 62 may proceed to authenticate the client that sent the connection request (block 156). The TN3270E server 62 may use any of a variety of criteria to determine whether or not to perform such authentication (e.g., authenticate all connection requests, authenticate none, authenticate connection requests associated with certain LU names, authenticate connection requests received over certain network paths, etc.).

If authentication is to be performed, the TN3270E server 62 performs the authentication procedures (block 158) to determine if the connection request is authentic. Such authentication may be done, for example, in a CS-OS/390 based TN3270E server by having the Resource Access Control Facility ("RACF") of the OS/390 perform a full Secure Socket Layer ("SSL") client authentication on a digital X.509 certificate received from the TN3270E client along with the connection request. Such an X.509 certificate may be "burnt" onto the hard drive at the TN3270E client terminal or input via a "swipe" card, and may include, among other things, a user identification. The user at the TN3270E client 60 may also be required to input a password which is forwarded to the TN3270E server 62 along with the X.509 certificate, typically in an encrypted format. A connection request may be considered "authentic" if the password received from the client is the correct password for the received user identification.

If the client authentication procedures indicate that the connection request is not authentic (block 160), then the connection request is rejected (block 162), and operations are concluded.

If, on the other hand, at block 160 it is determined that the connection request is authentic, the certificate forwarded along with the connection request is compared to the certificate associated with the TN3270E client 60 to which the specified LU name has already been allocated (block 164). If the two certificates are not the same (block 166), then the connection request may be rejected (block 162). If instead, at block 166 the two certificates are the same, the TN3270E server 62 sends a message to the first TN3270E client 60 over the original IP connection 58 which requires a response from the TN3270E client 60 (block 170). Typically, this request will be for a response that may be immediately provided by the TN3270E client 60 without the need for user input, such as a timemark request (i.e., a request that the terminal send the value of its time-of-day clock).

Upon sending this message, the TN3270E server 62 starts a response timer (block 172) and monitors for a response to the message from the TN3270E client 60. If a response is received before the response timer times out (block 174), the connection request is rejected (block 162). If a response has not been received by the time the response timer times out (block 174), the connection request is allowed and the requested IP connection is established (block 176).

Once the new IP connection has been established, the TN3270E server 62 may send an LUSTAT message to the SNA application 64 (block 178). An LUSTAT message refers to a command flow which requests that the SNA application resend or "refresh" the last screen which the TN3270E client 60 acknowledged as having received correctly. Thus, by sending the LUSTAT message to the SNA application 64, the TN3270E server 62 can prompt the SNA application 64 to resynchronize the TN3270E client 60 after the lost IP connection 58 has been restored, and do so in a manner that preserves the SNA session 54 between the SNA application 64 and the TN3270E server 62.

It will be appreciated that the operations depicted in the flow charts of FIGS. 4–6 need not always be performed in the particular order indicated. For instance, in FIG. 6, the authentication operations of blocks 158, 160 might be carried out after the timemark was forwarded to the TN3270E client 60 at block 170. Likewise, typically the operations of blocks 170 (sending the timemark) and 172 (starting the response timer) are carried out substantially simultaneously, but they could also be carried out sequentially, in either order. It will be appreciated that various other modifications could be made to the order in which the operations are performed without departing from the scope or teachings of the present invention.

As noted above, in embodiments of the present invention, a response timer is set when a query is sent from the TN3270E server 62 to the TN3270E client 60 after the TN3270E server 62 receives a connection request that specifies an already allocated LU name. This response timer may be set to a fixed value or may be a variable parameter that is dependent, for example, on the LU name allocated, the network path of the first IP connection, network delay data or various other parameters. Typically, the response timer is set to be somewhat greater than the expected response time for a response to a query, yet less than the setting on the inactivity timer at the TN3270E server 62. In this manner, the response timer may run out before the inactivity timer at the TN3270E server 62, thereby alerting the TN3270E server 62 to the loss of the connection faster than normal, facilitating a faster reconnect of the lost IP connection.

As is also noted above, the operations for speeding up the reconnect of a TCP/IP or other connection in the IP network may include an authentication procedure. Such authentication may be advantageous because depending upon the setting on the response timer, it may be possible that the response timer will run out even though the original TCP/IP connection has not been lost due to delays in the network in either sending the timemark or receiving the TN3270E client's response thereto. By including authentication measures, it is possible to guard against unauthorized access to the SNA session by another user that sends a connection request specifying an already allocated LU name. The robustness of the security scheme used may depend upon the sensitivity of the information involved, the settings on the response timer, and/or various other parameters.

In embodiments of the present invention, the SNA session between the TN3270E server 62 and the SNA application 64 is preserved by resynchronizing the TN3270E client 60 and the SNA application 64 using a screen refresh procedure. In this manner, the TN3270E server 62 and/or the SNA application 64 may supply the necessary session information to the TN3270E client 60 after loss of the IP connection 58 (since the client typically retains no knowledge of the SNA session 54 across the reconnect).

As noted above, in embodiments of the present invention, the TN3270E server 62 requests that the SNA application 64 perform a screen refresh by sending an LUSTAT message to the SNA application 64. In response to the LUSTAT message, the SNA application 64 typically sends a logon screen to the TN3270E client 60 that prompts the end user to enter a user identification and password. Once validated (where validation may be performed by either the TN3270E server 62 or the SNA application 64), the last acknowledged data screen sent prior to the reconnect is retransmitted to the TN3270E client 60.

As will be appreciated by those of skill in the art, some SNA applications may not include a screen refresh capability, as they may not buffer the last screen which was acknowledged as received by the TN3270E client. However, even with these applications the methods, systems and computer program products of the present invention may improve network performance as these applications typically still prompt the TN3270E client to re-logon to the SNA application via the log-on screen. Such a re-logon may not be viewed by the network as the termination of the original SNA session and, consequently, the original session is not terminated and reestablished. Additionally, some SNA applications may not support receipt of an LUSTAT message. With respect to these applications, loss of the IP connection 25 will typically result in termination of the session.

Embodiments of the present invention are described and claimed herein with reference to TN3270E clients and servers. As used herein, the term "TN3270E client" is meant to refer to any 3270 terminal, or any device emulating a 3270 terminal, in which the device or its user specifies an LU name or other identifying feature when establishing a network connection and/or when accessing an SNA application. Accordingly, it will be appreciated that the term "TN3270E client" is meant to not only encompass client terminals and devices operating in the TN3270E environment, but also client terminals and devices operating in modified versions of that environment so long as they specify an LU name or other identifying feature. The term "TN3270E server" is likewise intended to encompass both servers operating in the TN3270E environment and servers operating in modified versions or variations of the TN3270E environment. Furthermore, as described above, the term "TN3270E server" refers to any system which interfaces between the IP connection and the SNA session. Thus, the TN3270E server may appear as a server to the TN3270E client and as a terminal to the SNA application.

Reference is also made herein to "SNA sessions." It will be appreciated that such SNA sessions refer to a session layer connection in the SNA network architecture or its equivalent in variations or modified versions of the layered SNA network architecture.

Additionally, reference is made herein to clients and servers. As used herein, a "client" refers to a computer, workstation, terminal or other data processing device that accesses over a network an application, data set, etc. from another data processing/storage device. A "server" refers to a data processing system which provides a response to a communication from a client. It will be appreciated that the same data processing device may be both a client and server with respect to different operations.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A method for preserving a session between an SNA application and a TN3270E server after loss of an IP connection between the TN3270E server and a TN3270E client that is associated with the session, the method comprising:

reestablishing the IP connection between the TN3270E server and the TN3270E client; and then forwarding a screen refresh request to the SNA application;

receiving a screen refresh from the SNA application; and forwarding the screen refresh to the TN3270E client over the reestablished IP connection, wherein forwarding a screen refresh request to the SNA application comprises sending an LUSTAT message to the SNA application.

2. The method of claim 1, wherein the method further comprises:

receiving a user logon, screen from the SNA application in response to an LUSTAT message;

forwarding the user logon screen to the TN3270E client;

receiving the user logon information from the TN3270E client checking the authenticity of the received user logon information; and forwarding the screen refresh to the TN3270E client over the reestablished IP connection only if the received user logon information is authentic.

3. The method of claim 2, wherein forwarding a screen refresh request to the SNA application, receiving a screen refresh from the SNA application, and forwarding the screen refresh to the TN3270E client over the reestablished IP connection are performed by the TN3270E server.

4. The method of claim 1, wherein the screen refresh received from the SNA application and forwarded to the TN3270E client comprises a last data screen that was forwarded from the SNA application and acknowledged as received by the TN3270E client.

5. The method of claim 1, wherein the method further comprises:
receiving a user logon screen from the SNA application in response to the screen refresh request;
forwarding the user logon screen to the TN3270E client;
receiving logon information from the TN3270E client
checking the authenticity of the received logon information; and
resuming the session if the received logon information is authentic.

6. The method of claim 1, wherein the IP connection comprises a TCP/IP connection.

7. A system for preserving a session between an SNA application and a TN3270E server after loss of an IP connection between the TN3270E server and a TN3270E client that is associated with the session, comprising:
means for reestablishing the P connection between the TN3270E server and the TN3270E client;
means for forwarding a screen refresh request to the SNA application;
means for receiving a screen refresh from the SNA application; and
means for forwarding the screen refresh to the TN3270E client over the reestablished IP connection, wherein forwarding a screen refresh request to the SNA application comprises sending an LUSTAT message to the SNA application.

8. A computer program product for preserving a session between an SNA application and a TN3270E server after loss of an IP connection between the TN3270E server and a TN3270E client that is associated with the session, the computer program product comprising a computer usable storage medium having computer readable program code means embodied in the medium, the computer readable program code means comprising:
computer readable program code means for reestablishing the IP connection between the TN3270E server and the TN3270E client;
computer readable program code means for forwarding a screen refresh request to the SNA application;
computer readable program code means for receiving a screen refresh from the SNA application; and
computer readable program code means for forwarding the screen refresh to the TN3270E client over the reestablished IP connection, wherein forwarding a screen refresh request to the SNA application comprises sending an LUSTAT message to the SNA application.

9. A method for preserving a session between an SNA application server and a second server after loss of an IP connection between the second server and an SNA client that is associated with the session, the method comprising:
reestablishing the IP connection between the second server and the SNA client;
receiving a screen refresh request from the SNA client over the reestablished IP connection;
forwarding a screen refresh request to the SNA application server;
receiving a screen refresh from the SNA application server in response to the screen refresh request;
forwarding the screen refresh to the SNA client over the reestablished IP connection, wherein forwarding a screen refresh request to the SNA application server comprises sending an LUSTAT message to the SNA application server.

10. The method of claim 9, wherein the method further comprises:
receiving a user logon screen from the SNA application server in response to the LUSTAT message;
forwarding the user logon screen to the SNA client;
receiving logon information from the SNA client;
checking the authenticity of the received logon information; and
forwarding the screen refresh to the SNA client over the reestablished IP connection only if the received logon information is authentic.

11. The method of claim 9, wherein the screen refresh received from the SNA application server and forwarded to the SNA client comprises a last data screen that was forwarded from the SNA application server and acknowledged as received by the SNA client.

* * * * *

UNITED STATES PATENT AND TRADEMARK OFFICE
CERTIFICATE OF CORRECTION

PATENT NO. : 7,089,311 B2  Page 1 of 1
APPLICATION NO. : 09/773437
DATED : August 8, 2006
INVENTOR(S) : Devine et al.

It is certified that error appears in the above-identified patent and that said Letters Patent is hereby corrected as shown below:

Column 10,
Line 59 should read -- client; --

Column 11,
Line 24 should read -- means for reestablishing the IP connection between the --

Signed and Sealed this

Ninth Day of January, 2007

JON W. DUDAS
*Director of the United States Patent and Trademark Office*